(12) United States Patent
Song et al.

(10) Patent No.: US 11,768,326 B2
(45) Date of Patent: Sep. 26, 2023

(54) BACKLIGHT MODULE AND DISPLAY DEVICE

(71) Applicants: MIANYANG HKC OPTOELECTRONICS TECHNOLOGY CO., LTD., Sichuan (CN); HKC CORPORATION LIMITED, Shenzhen (CN)

(72) Inventors: Danwang Song, Sichuan (CN); Haijiang Yuan, Sichuan (CN)

(73) Assignees: MIANYANG HKC OPTOELECTRONICS TECHNOLOGY CO., LTD., Mianyang (CN); HKC CORPORATION LIMITED, Baqan District (CN)

( * ) Notice: Subject to any disclaimer, the term of this patent is extended or adjusted under 35 U.S.C. 154(b) by 0 days.

(21) Appl. No.: 18/091,069

(22) Filed: Dec. 29, 2022

(65) Prior Publication Data

US 2023/0258859 A1    Aug. 17, 2023

(30) Foreign Application Priority Data

Feb. 16, 2022    (CN) .................. 202210143290.X

(51) Int. Cl.
*F21V 8/00*    (2006.01)
(52) U.S. Cl.
CPC ........... *G02B 6/0088* (2013.01); *G02B 6/009* (2013.01)
(58) Field of Classification Search
CPC .............................. G02B 6/0088; G02B 6/009
See application file for complete search history.

(56) References Cited

U.S. PATENT DOCUMENTS

2016/0259120 A1    9/2016    Hsiao et al.

FOREIGN PATENT DOCUMENTS

| CN | 105204227 A | 12/2015 |
|---|---|---|
| CN | 205157936 U | 4/2016 |
| CN | 208621885 U | 3/2019 |
| CN | 210428033 U | 4/2020 |
| CN | 213904011 U | 8/2021 |
| CN | 214669696 U | 11/2021 |
| WO | 2014015482 A1 | 1/2014 |

OTHER PUBLICATIONS

First Office Action issued in corresponding CN Application No. CN202210143290 X, dated Oct. 14, 2022, pp. 1-5, Beijing, China.

*Primary Examiner* — Mary Ellen Bowman
(74) *Attorney, Agent, or Firm* — HAUPTMAN HAM, LLP

(57) ABSTRACT

A backlight module and a display device are provided. The backlight module includes a back cover, a support plate, a plastic frame, an engaging member, and a film assembly. The back cover includes a bottom cover and a side cover. The side cover is connected with a periphery of the bottom cover. The side cover and the bottom cover cooperatively define an accommodation space. The support plate is connected with the side cover. The plastic frame includes a side wall and a top wall. The side wall is connected with a periphery of the top wall. The engaging member is located between the support plate and the top wall, and connected with the support plate or the top wall. The film assembly is mounted in the accommodation space. The film assembly includes a film assembly body and a tab.

16 Claims, 10 Drawing Sheets

BACKLIGHT MODULE AND DISPLAY DEVICE

CROSS-REFERENCE TO RELATED APPLICATIONS

This application claims priority under 35 U.S.C. § 119(a) to Chinese Patent Application No. 202210143290.X, filed Feb. 16, 2022, the entire disclosure of which is incorporated herein by reference.

TECHNICAL FIELD

This disclosure relates to the field of display technology, and in particular to a backlight module and a display device.

BACKGROUND

At present, multi-place and multi-function application demands of liquid crystal display devices are increasing, and requirements of product reliability are also increasing. However, in application environments such as large temperature and humidity changes and suspension at a large inclined angle, an optical film assembly inside the liquid crystal display device is prone to detachment, displacement, arching, and other phenomena due to unreasonable limiting, results in a failure of a product function and a quality problem.

SUMMARY

In a first aspect, a backlight module is provided in the present disclosure. The backlight module includes a back cover, a support plate, a plastic frame, an engaging member, and a film assembly. The back cover includes a bottom cover and a side cover. The side cover is connected with a periphery of the bottom cover. The side cover and the bottom cover cooperatively define an accommodation space. The support plate is connected with the side cover. The support plate is bent relative to the side cover and is located in the accommodation space. The plastic frame includes a side wall and a top wall. The side wall is connected with a periphery of the top wall. The side wall is fixedly connected with the side cover. The top wall is located at one side of the support plate away from the bottom cover. The engaging member is located between the support plate and the top wall, and connected with the support plate or the top wall. The film assembly is mounted in the accommodation space. The film assembly includes a film assembly body and a tab. The tab is connected with a peripheral side surface of the film assembly body. The film assembly body is located at one side of the engaging member facing the accommodation space. The tab is at least partially located between the support plate and the top wall. The tab is snapped into the engaging member. The top wall covers the tab and a periphery of the film assembly body.

In a second aspect, a display device includes a liquid display panel and a backlight module. The backlight module includes a back cover, a support plate, a plastic frame, an engaging member, and a film assembly. The back cover includes a bottom cover and a side cover. The side cover is connected with a periphery of the bottom cover. The side cover and the bottom cover cooperatively define an accommodation space. The support plate is connected with the side cover. The support plate is bent relative to the side cover and is located in the accommodation space. The plastic frame includes a side wall and a top wall. The side wall is connected with a periphery of the top wall. The side wall is fixedly connected with the side cover. The top wall is located at one side of the support plate away from the bottom cover. The engaging member is located between the support plate and the top wall, and connected with the support plate or the top wall. The film assembly is mounted in the accommodation space. The film assembly includes a film assembly body and a tab. The tab is connected with a peripheral side surface of the film assembly body. The film assembly body is located at one side of the engaging member facing the accommodation space. The tab is at least partially located between the support plate and the top wall. The tab is snapped into the engaging member. The top wall covers the tab and a periphery of the film assembly body. The liquid display panel is located at one side of the film assembly away from the bottom cover, and is fixedly connected with the plastic frame.

DETAILED DESCRIPTION

Technical solutions of implementations of the present disclosure will be described clearly and completely with reference to accompanying drawings in implementations of the present disclosure below. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

In the description of the present disclosure, it should be indicated that unless otherwise expressly specified or defined, terms such as "mount", "couple", and "connect" should be understood broadly, and for example, may be a fixed connection, or a detachable connection, or an integrated connection; may be a mechanical connection, or an electrical connection; and may be a direct connection, or an indirect connection via an intermediate medium, or may be an internal communication between two elements. The specific meanings of the above-mentioned terms in the present disclosure could be understood by those of ordinary skill in the art according to specific situations. A term "and/or" describes an association relationship between associated objects and represents that three relationships may exist. For example, A and/or B may represent the following three cases: only A exists, both A and B exist, and only B exists.

In the description of the present disclosure, reference throughout this specification to "implementations", "specific implementation", "example", etc., means that a particular feature, structure, material, or characteristic described in connection with the implementation or example is included in at least one implementation or example of the present disclosure. In the specification, schematic representations of the above terms do not necessarily refer to the same implementation or example of the present disclosure. In addition, the particular features, structures, materials, or characteristics described may be combined in any suitable manner in one or more implementations or examples.

A backlight module and a display device including the backlight module are provided in implementations of the present disclosure. A part of a back cover of the backlight module is bent to form a limiting member, such that the film assembly can be supported in a third direction and limited in a first direction and a second direction. Here, the back cover is snapped into grooves defined at part of the plastic frame, such that the film assembly can be further limited in the third direction. In addition, a certain gap is defined between the film assembly and the limiting member, so as to meet requirements of material characteristics and ensure stable quality of the display device.

Figure 1:
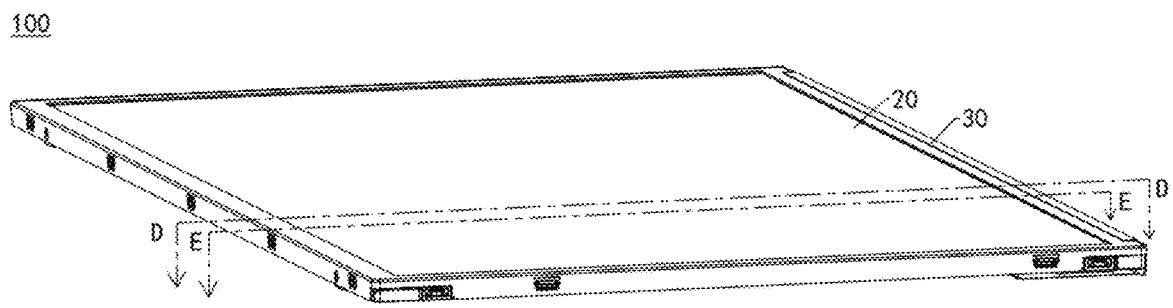
FIG. 1 is a partial schematic structural diagram of a display device provided in some implementations of the present disclosure.
Figure 2:
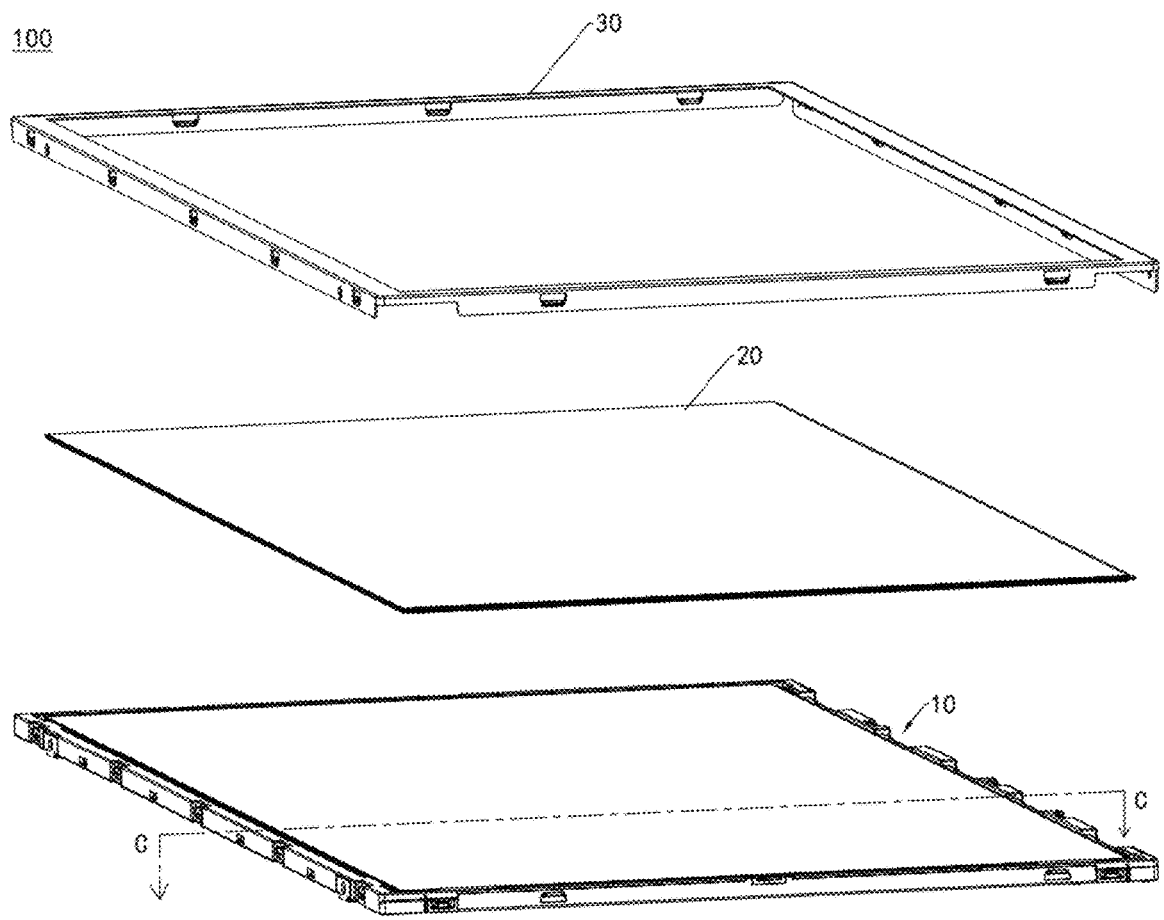
FIG. 2 is a partial exploded schematic structural diagram of the display device illustrated in FIG. 1.

Reference can be made to FIG. 1 and FIG. 2, where FIG. 1 is a partial schematic structural diagram of a display device 100 provided in some implementations of the present disclosure, and FIG. 2 is a partial exploded schematic structural diagram of the display device 100 illustrated in FIG. 1.

In some implementations, the display device 100 may include a backlight module 10, a liquid display panel 20, and an outer frame 30. The liquid display panel 20 is fixed at a light-exiting side of the backlight module 10. The outer frame 30 is fixed to a periphery of the backlight module 10 and at least partially covers a light-exiting side around a periphery of the liquid display panel 20. In implementations of the present disclosure, "at least part" includes two conditions, i.e., part and all. The outer frame 30 may be detachably connected with the backlight module 10, for example, the outer frame 30 may be buckled with the backlight module 10. In implementations of the present disclosure, "the first direction", "the second direction", and "the third direction" of the backlight module 10 are descriptions of relative directions. The backlight module 10 may substantially be a rectangular plate, and the backlight module 10, i.e., the rectangular plate has two edges approximately perpendicular to each other. A direction parallel to one edge of the backlight module 10, i.e., the rectangular plate, is taken as the first direction, a direction parallel to the other edge of the backlight module 10, i.e., the rectangular plate, is taken as the second direction, and a direction parallel to the thickness of the backlight module 10, i.e., the rectangular plate, is taken as the third direction, where the third direction is perpendicular to a plane where the backlight module 10 is located.

Figure 3:
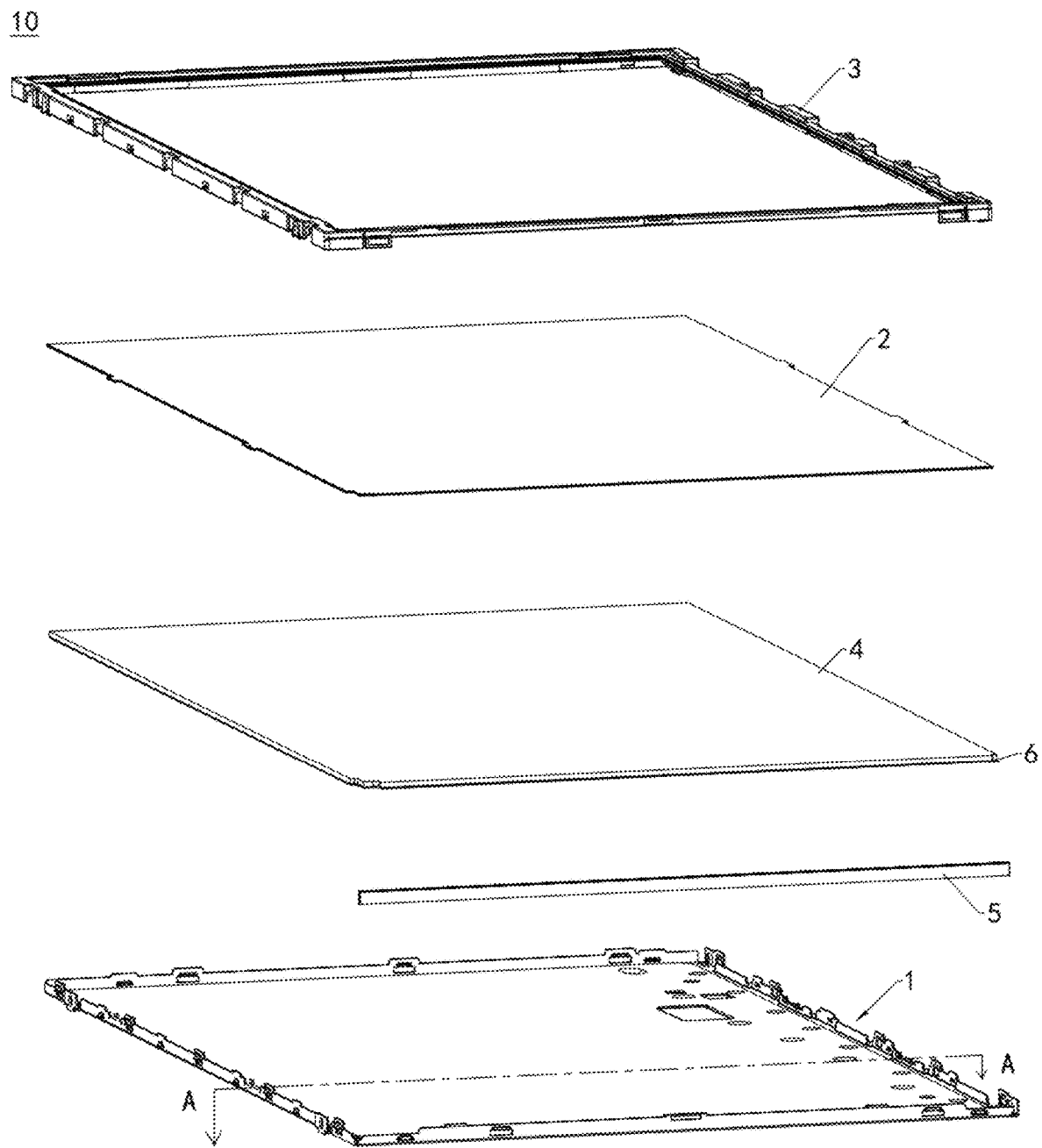
FIG. 3 is an exploded schematic structural diagram of a backlight module illustrated in FIG. 2.

Reference can be made to FIG. 3, which is an exploded schematic structural diagram of a backlight module 10 illustrated in FIG. 2.

In some implementations, the backlight module 10 may include a back cover 1, a film assembly 2, a plastic frame 3, a light guide plate 4, a light strip 5, and a reflecting plate 6. The back cover 1 can function as a base of the backlight module 10. Components such as the film assembly 2, the light guide plate 4, the light strip 5, and the reflecting plate 6 can be mounted in the back cover 1. The plastic frame 3 is fixed to a periphery of the back cover 1. The plastic frame 3 and the back cover 1 together limit the film assembly 2, the light guide plate 4, the light strip 5, and the reflecting plate 6. The plastic frame 3 may be detachably connected with the back cover 1, for example, the plastic frame 3 may be buckled with or snapped into the back cover 1. The light strip 5 may include multiple light-emitting diodes (LEDs). The light guide plate 4 is configured to convert lights emitted by the multiple LEDs of the light strip 5 into lights of area light source and then emits the lights converted.

Figure 4:
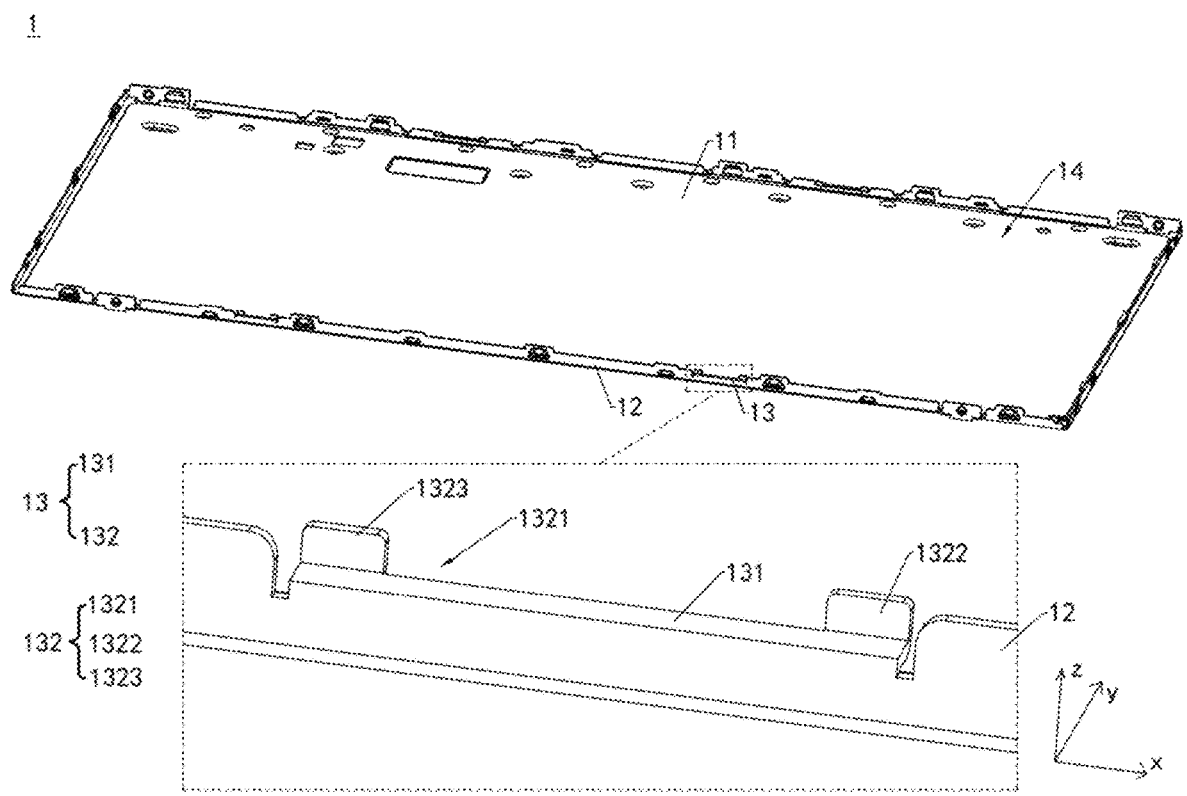
FIG. 4 is a schematic structural diagram of a back cover illustrated in FIG. 3 from another angle.
Figure 5:
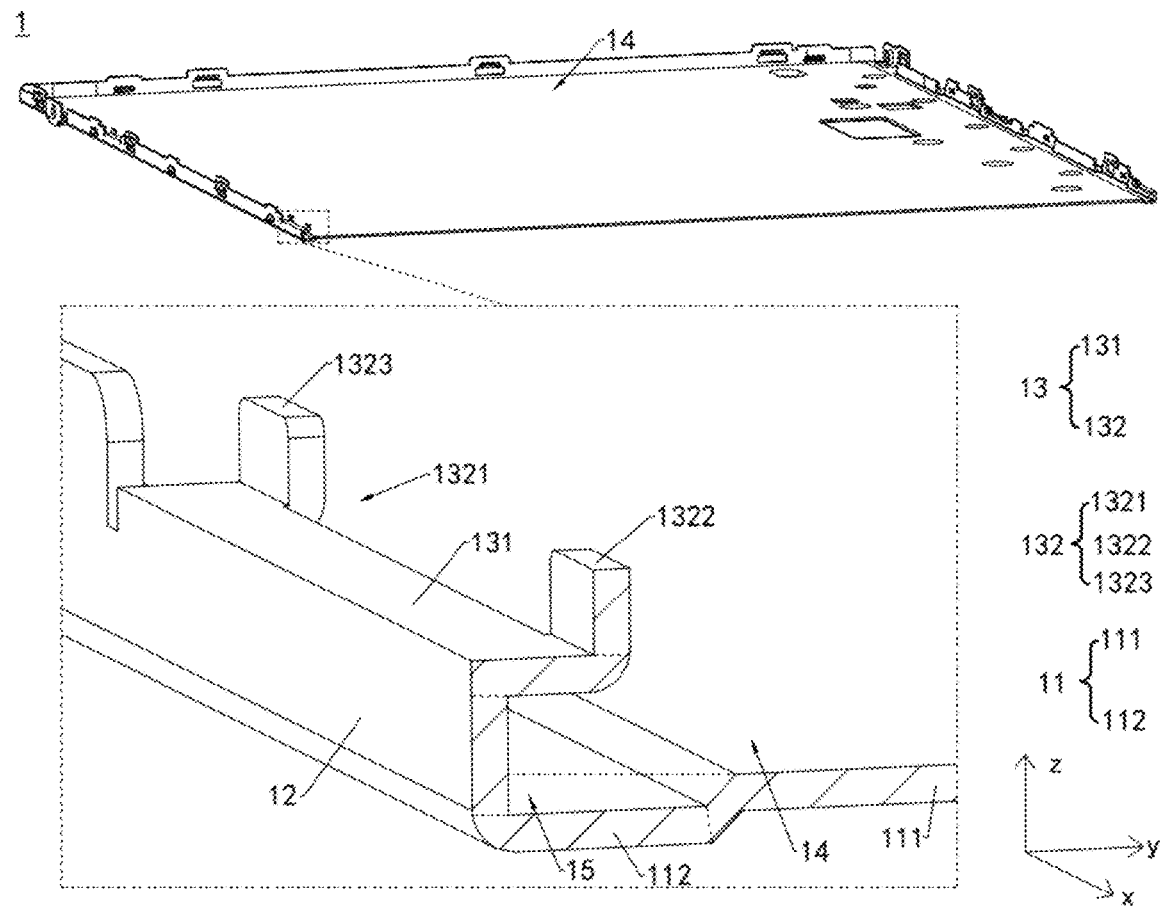
FIG. 5 is a schematic cross-sectional structural diagram of a back cover illustrated in FIG. 3, taken along A-A.

Reference can be made to FIG. 4 and FIG. 5, where FIG. 4 is a schematic structural diagram of a back cover 1 illustrated in FIG. 3 from another angle, and FIG. 5 is a schematic cross-sectional structural diagram of a back cover 1 illustrated in FIG. 3, taken along A-A.

In some implementations, the back cover 1 may include a bottom cover 11, a side cover 12, and a limiting member 13. The side cover 12 is connected with a periphery of the bottom cover 11 and bent relative to the bottom cover 11 in third direction z of the bottom cover 11. The side cover 12 and the bottom cover 11 cooperatively define an accommodation space 14, and components such as the light strip 5 and the light guide plate 4 (as illustrated in FIG. 3) are accommodated in the accommodation space 14. The limiting member 13 is connected with the side cover 12, fixed to one side of the side cover 12 away from the bottom cover 11, and located in the accommodation space 14 inside the side cover 12. The limiting member 13 may include a support plate 131 and an engaging member 132. The support plate 131 is connected with the side cover 12 and bent relative to the side cover 12 in second direction y. The support plate 131 is located in the accommodation space 14. The engaging member 132 is connected with the support plate 131 and bent relative to the support plate 131 in third direction z. The engaging member 132 is located at one side of the support plate 131 away from the bottom cover 11.

The engaging member 132 defines a mounting space 1321, the engaging member 132 is divided into a first lug 1322 and a second lug 1323 by the mounting space 1321, and the first lug 1322 and the second lug 1323 are arranged in first direction x. In other words, the first lug 1322 is spaced apart from the second lug 1323. The first lug 1322 and the second lug 1323 each are connected with the support plate 131. The first lug 1322 and the second lug 1323 each extend in third direction z. In the present disclosure, reference can be made to FIG. 4 and FIG. 5, direction x is a first direction, direction y is a second direction, and direction z is a third direction. In the following related description, relative orientations of the first direction, the second direction and the third direction are similarly understood, and will not be repeated later.

In some implementations, the engaging member 132 may have a plate structure, and correspondingly the first lug 1322 and the second lug 1323 each also have a plate structure. In other implementations, the engaging member 132 may also have other structures, for example, the first lug 1322 and the second lug 1323 each may have a cylindrical structure, which is not strictly limited in the present disclosure.

In some implementations, the side cover 12, the bottom cover 11, the support plate 131, and the engaging member 132 may be integrated. For example, the back cover 1 may have an integrated structure formed by sheet stamping. In implementations of the present disclosure, the back cover 1 has a complete surrounding structure, so light leakage of the backlight module 10 can be prevented.

In other implementations, the back cover 1 may also have an integrated structure formed by welding the side cover 12, the bottom cover 11, the support plate 131, and the engaging member 132. During processing the back cover 1, an integrated member including at least one of the side cover 12 or the limiting member 13 may also be formed by stamping and other processes, and then the integrated member is welded with the bottom cover 11, which is not strictly limited in the present disclosure.

In implementations, the back cover 1 may be made of a metal material such as stainless steel. On one hand, the metal material is convenient for stamping and forming, and the design process is highly feasible, which has little impact on costs of products. On the other hand, the metal material has high support strength, and the back cover 1 made of the metal material has high reliability, which makes the display device have high structural strength and can protect internal components from damages as much as possible when the display device is impacted. In addition, due to high processing precision and high support strength of the metal material, the thickness of the back cover 1 can be designed to be thin, which is beneficial to lightness and thinning of the display device. Therefore, the limiting member 13, which can be formed by bending a metal back cover 1 locally, has a stable structure, is much less affected by environment, and has a simple process.

In some implementations, the bottom cover 11 may include a first part 111 and a second part 112. The second part 112 is connected with and disposed around the first part 111. The first part 111 exceeds the second part 112 at one side of the second part 112. The first part 111 protrudes toward the accommodation space 14. The first part 111 is configured to support the light guide plate 4 (as illustrated in FIG. 3). The side cover 12, the first part 111, and the second part 112 cooperative define a sinking groove 15, and the sinking groove 15 functions as a reserved space for mounting of the light strip 5 (as illustrated in FIG. 3). One side where the light strip 5 is located is a light incident side of the light guide plate 4.

In implementations, since screws (not illustrated) need to be mounted at one side of the bottom cover 11 away from the support plate 131, a certain height difference is designed between the first part 111 and the second part 112, so as to prevent the screws from abutting against an internal light guide plate.

Figure 6:
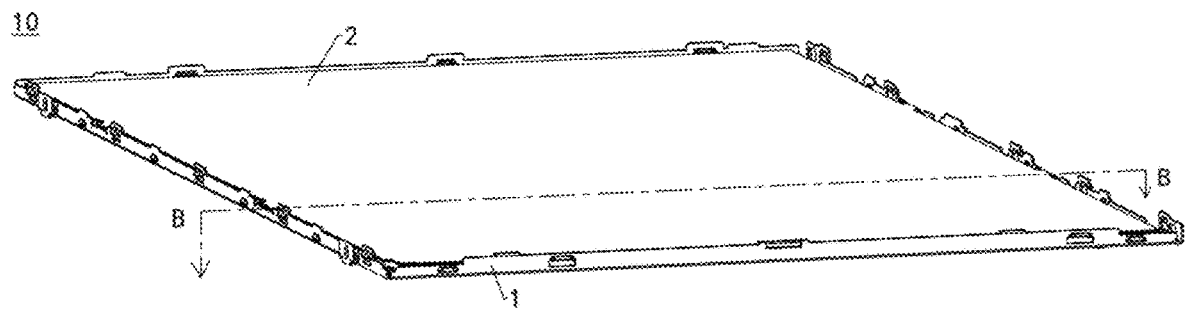
FIG. 6 is a partial schematic structural diagram of a backlight module illustrated in FIG. 2.
Figure 7:
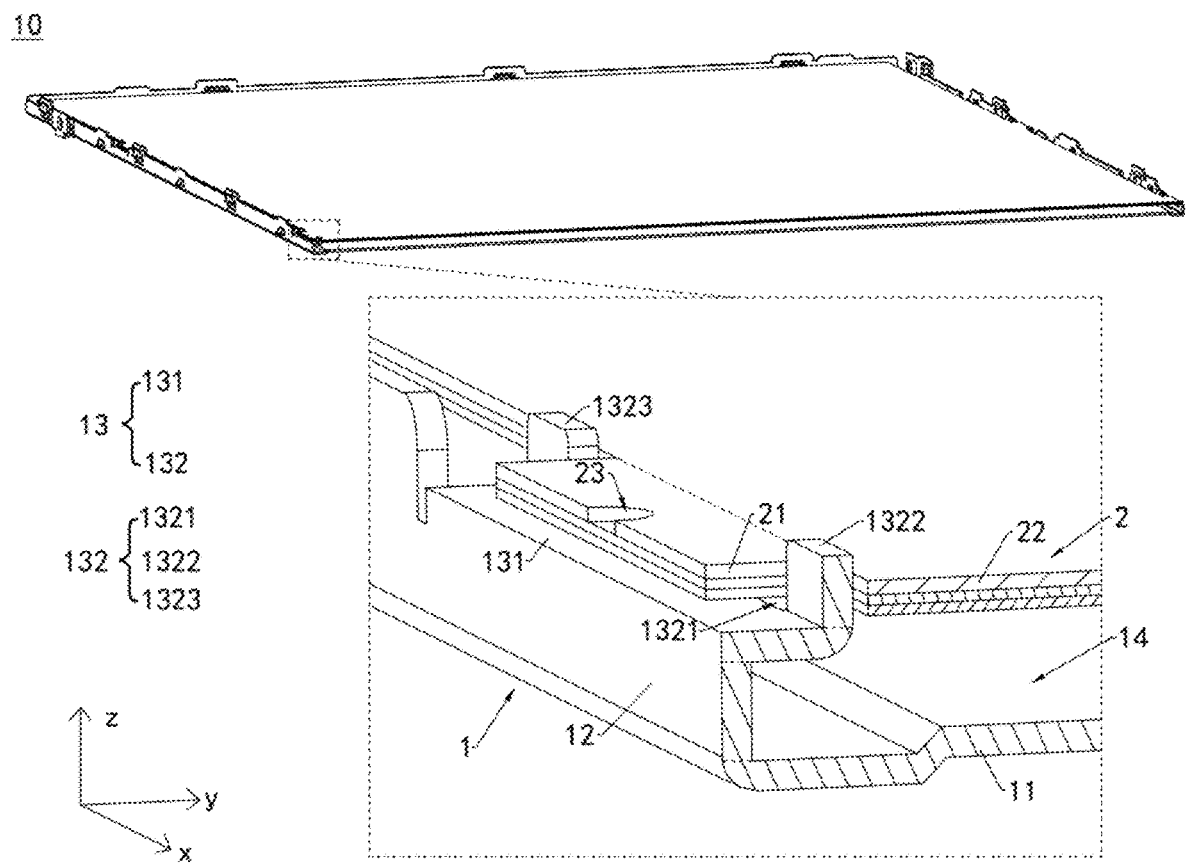
FIG. 7 is a schematic cross-sectional structural diagram of the backlight module illustrated in FIG. 6, taken along B-B.
Figure 8:
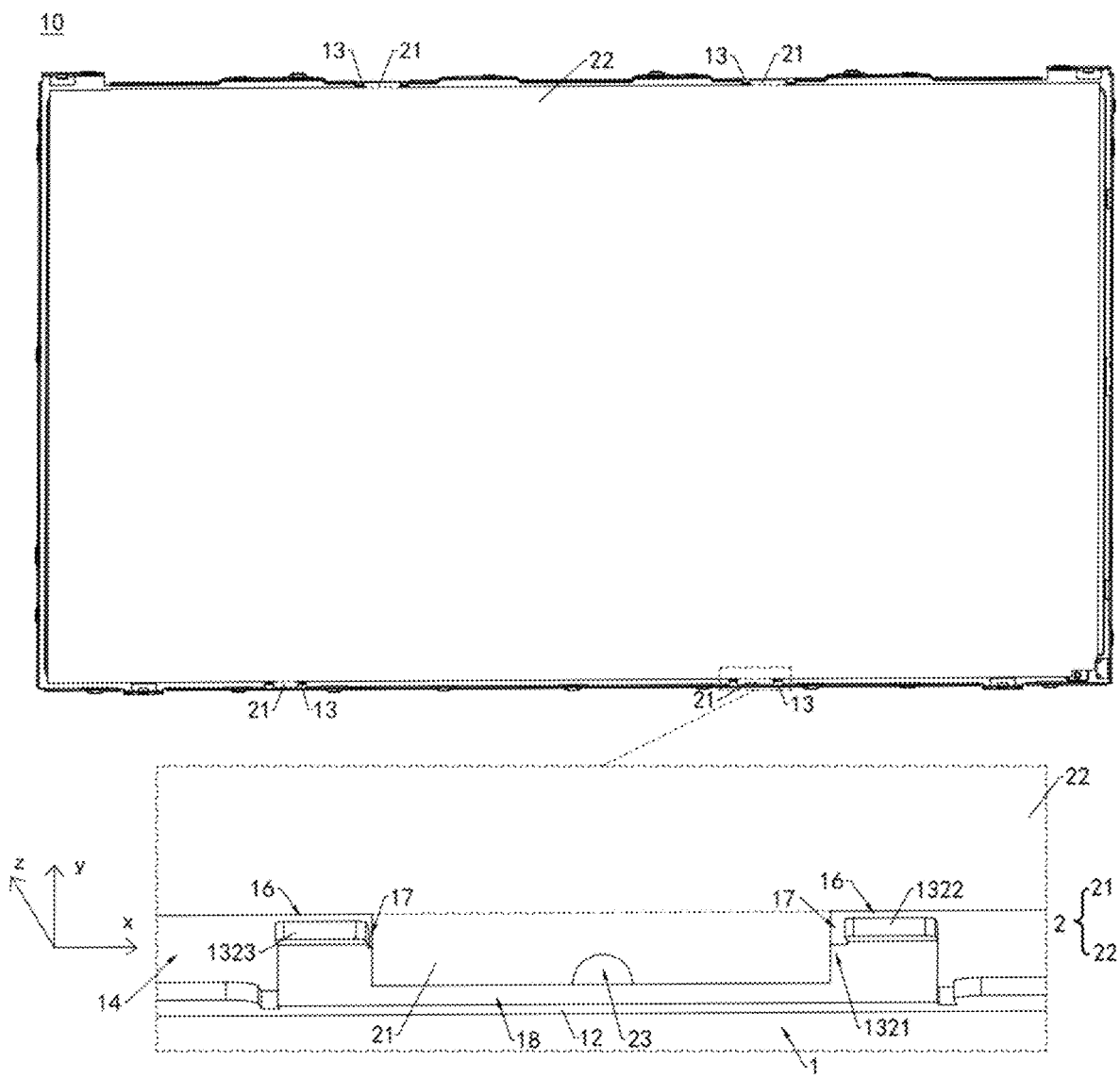
FIG. 8 is a partial schematic structural diagram of the backlight module illustrated in FIG. 6 from another angle.

Reference can be made to FIG. 6 to FIG. 8, where FIG. 6 is a partial schematic structural diagram of a backlight module 10 illustrated in FIG. 2, FIG. 7 is a schematic cross-sectional structural diagram of the backlight module 10 illustrated in FIG. 6, taken along B-B, and FIG. 8 is a partial schematic structural diagram of the backlight module 10 illustrated in FIG. 6 from another angle.

In some implementations, the film assembly 2 includes a tab 21 and a film assembly body 22. The film assembly 2 is mounted in the accommodation space 14. The tab 21 is connected with a peripheral side surface of the film assembly body 22. The film assembly body 22 is located at one side of the engaging member 132 facing the accommodation space 14. The film assembly 2 may include multiple overlapped optical films, and each of the multiple overlapped optical films is provided with a protrusion at a peripheral side. After the optical films are stacked, protrusions of the optical films constitute the tab 21 of the film assembly 2. The tab 21 extends in second direction y. The tab 21 is at least partially located at the side of the support plate 131 of the back cover 1 away from the bottom cover 11, and the tab 21 is snapped into the engaging member 132. For example, the tab 21 can be located in the mounting space 1321, that is, the tab 21 is located between the first lug 1322 and the second lug 1323 of the engaging member 132, and the first lug 1322 and the second lug 1323 are configured to limit the tab 21 together.

In implementations, the back cover 1 is provided with the support plate 131, such that the tab 21 of the film assembly 2 is supported in third direction z. Compared with supporting the tab 21 only by a flat surface in a thickness direction of the side cover 12, the support plate 131 in implementations has a large carrying area, such that the film assembly 2 can be effectively prevented from sinking and detaching, and the film assembly 2 is not easy to be deformed due to gravity.

In addition, the first lug 1322 and the second lug 1323 of the engaging member 132 limit the film assembly 2 in first direction x and second direction y, such that display can be prevented from being affected due to displacement of the film assembly 2 relative to the back cover 1, thereby ensuring reliable fixing of the film assembly 2, and high optical stability and stable quality of the display device.

In some implementations, a gap 16 is defined between one side of each of the first lug 1322 and the second lug 1323 of the engaging member 132 close to the accommodation space 14 and the film assembly body 22 in second direction y. A gap 17 is defined between one side of each of the first lug 1322 and the second lug 1323 of the engaging member 132 close to the mounting space 1321 and the tab 21 in first direction x. In addition, a gap 18 is defined between one side of the side cover 12 away from the accommodation space 14 and the tab 21 in second direction y.

In implementations, the gap 16 is defined between each of the first lug 1322 and the second lug 1323 and the film assembly body 22, the gap 17 is defined between each of the first lug 1322 and the second lug 1323 and the tab 21, and the gap 18 is defined between the side cover 12 and the tab 21, such that extrusion deformation and interference arching between the film assembly 2 and the back cover 1 due to expansion-shrinkage properties of a material of the film assembly 2 or mounting errors can be prevented. Three gaps between the back cover 1 and the film assembly 2 are designed to not only limit the film assembly 2, but also make the display device meet various reliability verification requirements such as a single-body vibration test, a whole-package vibration test, a drop test, a high-temperature and high-humidity storage test, which contributes to stable product quality. Therefore, the display device can be applied to environments such as great temperature and humidity changes or suspension at a large inclined angle.

In some implementations, the tab 21 of the film assembly 2 is arranged at least at a first side and a second side of the film assembly body 22. The first side and the second side may be adjacent edges or opposite edges of the film assembly body 22. The number of the limiting member 13 of the back cover 1 is the same as the number of the tab 21. In addition, when the film assembly 2 is mounted at the back cover 1, the limiting member 13 and the tab 21 are at the same position. For example, the position where the tab 21 and the limiting member 13 are disposed needs to avoid the light incident side of the guide light plate 4 where the light strip 5 is located. In other words, the tab 21 and the limiting member 13 may be disposed at two edges adjacent to the light incident side of the guide light plate 4 where the light strip 5 is located, or disposed at one edge opposite to the light incident side of the guide light plate 4 where the light strip 5 is located and one edge adjacent to the light incident side of the guide light plate 4 where the light strip 5 is located, such that interference is avoided.

In some implementations, several films constituting the film assembly 2 are made of different materials but have the same size, so different films can be provided with mounting marks 23 to avoid errors during assembly of different films. A mounting mark 23 may be a pattern, a protrusion, a groove, etc., which is not strictly limited in implementations of the present disclosure.

Figure 9:
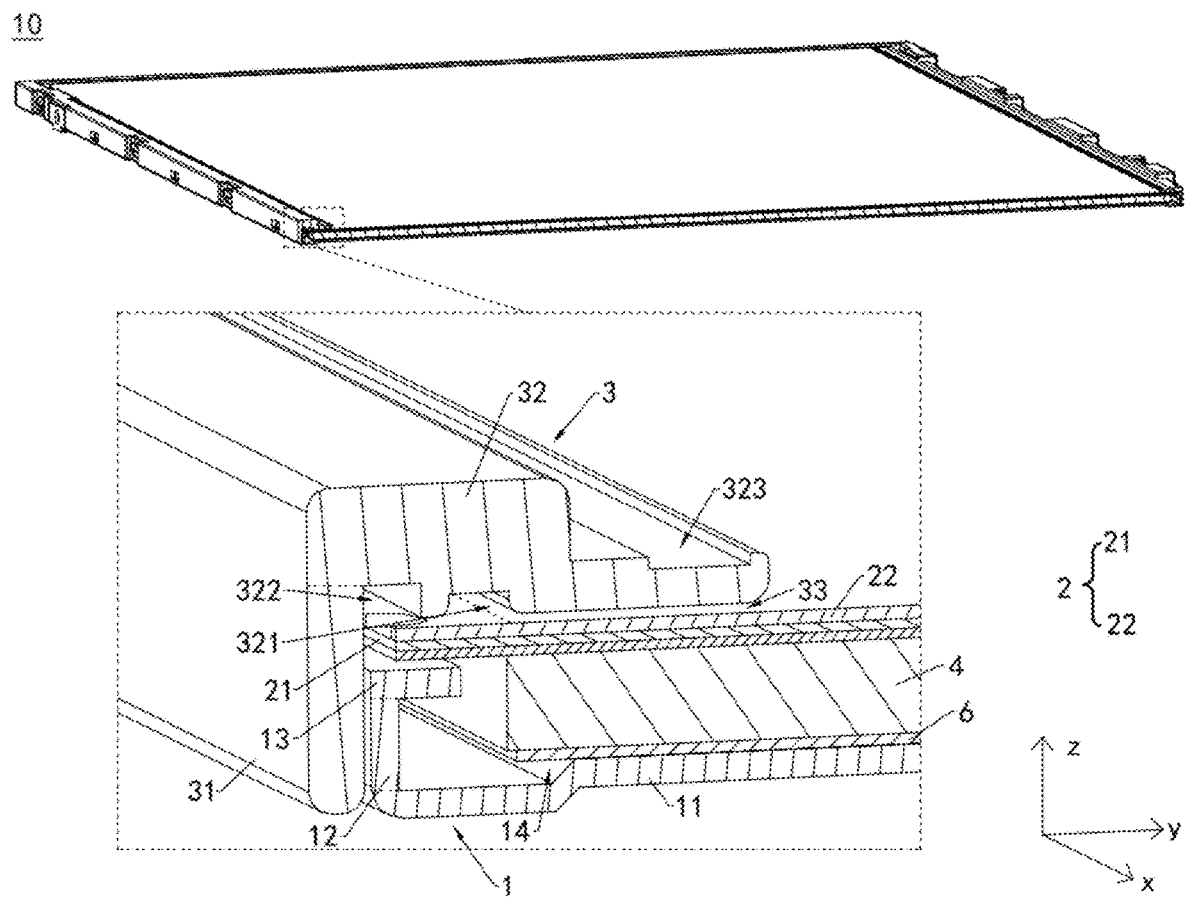
FIG. 9 is a schematic cross-sectional structural diagram of a backlight module illustrated in FIG. 2, taken along C-C.
Figure 10:
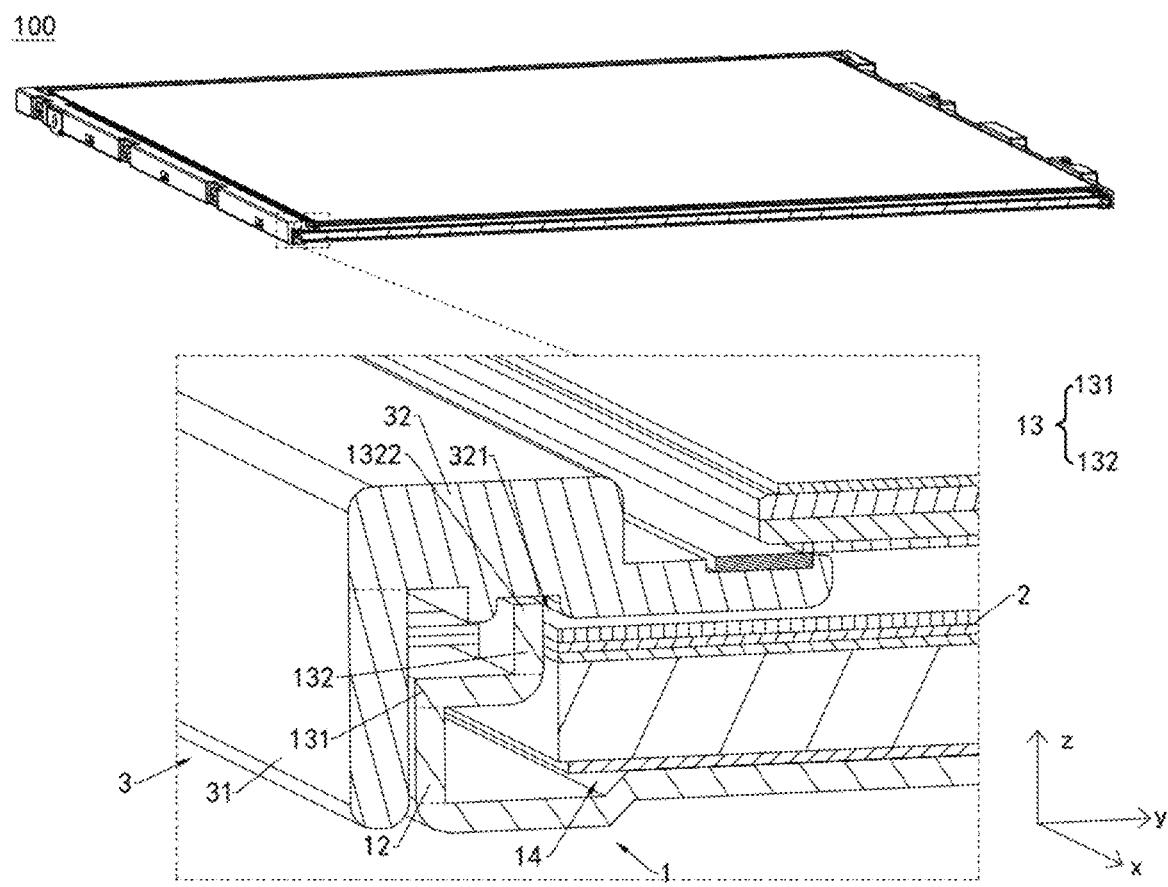
FIG. 10 is a partial schematic cross-sectional structural diagram of the display device illustrated in FIG. 1, taken along D-D.
Figure 11:
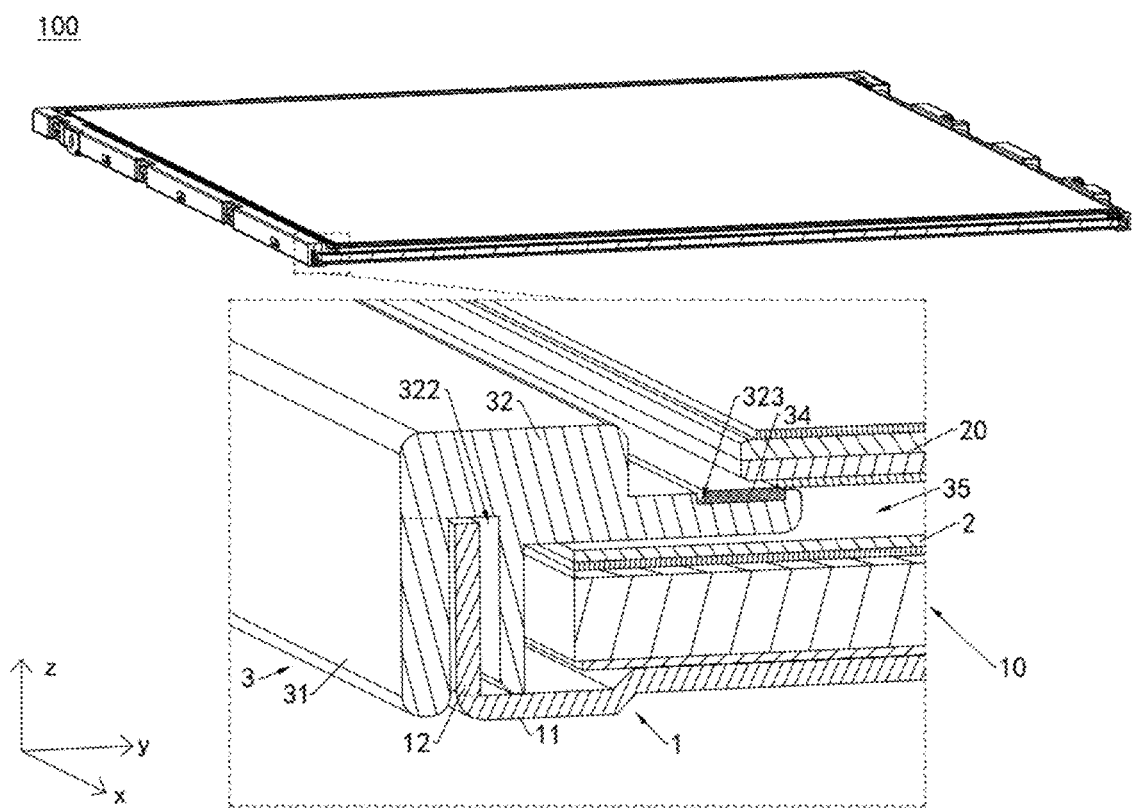
FIG. 11 is a partial schematic cross-sectional structural diagram of the display device illustrated in FIG. 1, taken along E-E.

Reference can be made to FIG. 9 to FIG. 11, where FIG. 9 is a schematic cross-sectional structural diagram of a backlight module 10 illustrated in FIG. 2, taken along C-C, FIG. 10 is a partial schematic cross-sectional structural diagram of the display device 100 illustrated in FIG. 1, taken along D-D, and FIG. 11 is a partial schematic cross-sectional structural diagram of the display device 100 illustrated in FIG. 1, taken along E-E.

In some implementations, the reflecting plate 6, the light guide plate 4, and the film assembly 2 are mounted in the accommodation space 14 of the back cover 1 and sequentially mounted on the bottom cover 11 in third direction z. In other words, the reflecting plate 6 is fixed to the bottom cover 11, the light guide plate 4 is fixed to the reflecting plate 6, the film assembly 2 is fixed to the light guide plate 4, and the plastic frame 3 is fixed to the periphery of the back cover 1 and a periphery of the film assembly 2. In other words, the bottom cover 11 and the plastic frame 3 are configured to together limit the reflecting plate 6, the light guide plate 4, and the film assembly 2 in third direction z.

In some implementations, the plastic frame 3 has a side wall 31 and a top wall 32. The side wall 31 is connected with a periphery of the top wall 32. The side wall 31 is fixedly connected with the side cover 12. The side wall 31 may be detachably connected with the side cover 12. For example, the side wall 31 may be snapped into the side cover 12. The top wall 32 of the plastic frame 3 is located at the side of the support plate 131 away from the bottom cover 11. The engaging member 132 is located between the support plate 131 and the top wall 32. The tab 21 is partially located between the support plate 131 and the top wall 32. The top wall 32 covers the tab 21 and the periphery of the film assembly body 22. A gap 33 is defined between the top wall 32 and the film assembly 2. In implementations, a certain gap 33 is defined between the top wall 32 and the film assembly 2 in third direction z, such that the film assembly 2 is not easy to abut against the top wall 32, so as to avoid extrusion deformation and interference.

In some implementations, when the engaging member 132 is connected with the support plate 131, the top wall 32 of the plastic frame 3 defines a first limiting groove 321 at one side of the top wall 32 facing the accommodation space 14. The first lug 1322 and the second lug 1323 (as illustrated in FIG. 7) of the engaging member 132 are partially snapped into the first limiting groove 321. The height of the engaging member 132 is larger than the sum of the thickness of the film assembly 2 and the depth of the first limiting groove 321. In addition, the top wall 32 of the plastic frame 3 further defines a second limiting groove 322 at the side of the top wall 32 facing the accommodation space 14. The second limiting groove 322 is spaced apart from the first limiting groove 321 and is located between the first limiting groove 321 and the side wall 31. In addition, the second limiting groove 322 is defined opposite to the side cover 12 of the back cover 1, and the side cover 12 is partially snapped into the second limiting groove 322.

In implementations, the plastic frame 3 is fixed to the periphery of the back cover 1 and the periphery of the film assembly 2. The tab 21 of the film assembly 2 is horizontally placed on the support plate 131 of the back cover 1. The film assembly 2 is unable to be detached due to an enclosed space cooperatively defined by the plastic frame 3 and the back cover 1, such that the film assembly 2 is limited in third direction z. In addition, the limiting member 13 of the back cover 1 limits the film assembly 2 in first direction x and second direction y, the back cover 1 and the plastic frame 3 in implementations are in fit with each other, such that three-dimensional limiting of the film assembly 2 and effective support of a bearing surface are realized, so as to avoid displacement of the film assembly 2 relative to the light guide plate 4 and improve product reliability. In addition, the engaging member 132 of the back cover 1 is snapped into the first limiting groove 321 of the plastic frame 3, and the side cover 12 of the back cover 1 is snapped into the second limiting groove 322, such that double limiting and fixing between the plastic frame 3 and the back cover 1 are realized, which makes the backlight module 10 stable in structure and easy to be mounted.

In other implementations, the engaging member 132 may also be disposed at one side of the top wall 32 facing the bottom cover 11. Here, the top wall 32 defines no first limiting groove 321, the engaging member 132 is fixedly connected with the top wall 32, and the engaging member 132 can still limit the tab 21 in first direction x and second direction y. When the engaging member 132 is fixedly connected with the top wall 32, the engaging member 132 may be integrated with the plastic frame 3 as a structural member. The engaging member 132 may or may not be in contact with the support plate 131. A specific disposing mode of the engaging member 132 is not strictly limited in the present disclosure.

In other implementations, due to an influence of the thickness of the light guide plate 4, when the film assembly 2 is placed on the light guide plate 4, the height of the gap 33 between the film assembly 2 and the top wall 32 may be small, or no gap may be defined between the film assembly 2 and the top wall 32. Both of two cases are within an allowable range of mounting errors of the backlight module 10, which is not strictly limited in the present disclosure.

In other implementations, in addition to a snap-in connection between the side wall 31 of the plastic frame 3 and the side cover 12 of the back cover 1, an adhesive layer (not illustrated) may also be disposed between the side wall 31 and the side cover 21 to form more stable fixing between the plastic frame 3 and the back cover 1, which is not strictly limited in the present disclosure.

In some implementations, the plastic frame 3 may be made of plastic and other elastic materials, for example, the plastic frame 3 may be processed by a molding process. When the backlight module 10 is squeezed, an elastic plastic frame 3 can play a certain buffer role to protect the internal components.

Figure 12:
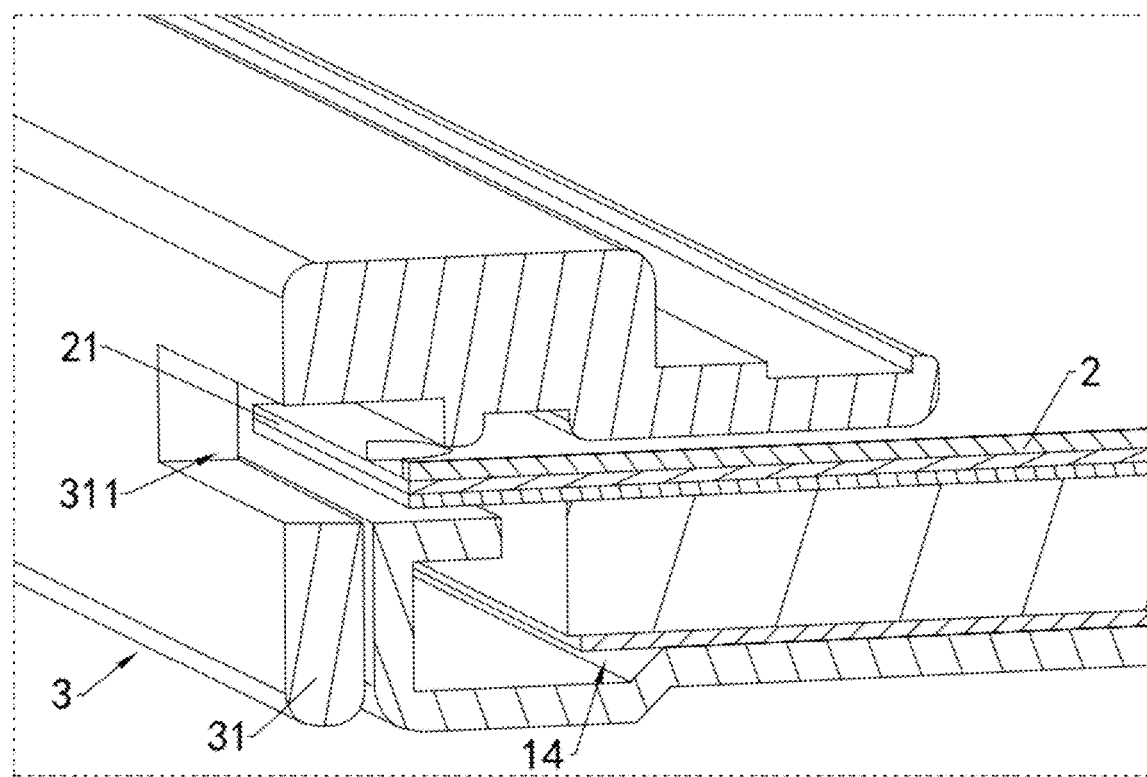
FIG. 12 is a partial schematic cross-sectional structural diagram of a backlight module illustrated in FIG. 2 in other implementations, taken along C-C.

Reference can be made to FIG. 12, which is a partial schematic cross-sectional structural diagram of a backlight module 10 illustrated in FIG. 2 in another implementation, taken along C-C.

In some implementations, the side wall 31 may define an avoidance space 311 at one side of the side wall 31 facing the accommodation space 14, and the avoidance space 311 is defined opposite to the tab 21. When a part of the tab 21 exceeding the side cover 12 has a relatively large size, the avoidance space 311 may be an opening. In other implementations, when the part of the tab 21 exceeding the side cover 21 has a relatively small size or no tab 21 exceeds the side cover 21, the avoidance space 311 may be a groove, which is not strictly limited in the present disclosure. In implementations, the side wall 31 defines the avoidance space 311, and when the tab 21 expands to abut against the side wall 31, the tab 21 can extend into the avoidance space 311 to prevent poor optics caused by squeezing deformation and arching interference of the film assembly 2.

Reference can be made to FIG. 9 and FIG. 11 again. In some implementations, the top wall 32 of the plastic frame 3 is also configured to support the liquid display panel 20 in third direction z. The liquid display panel 20 is located at one side of the film assembly 2 away from the bottom cover 11 and is fixedly connected with the plastic frame 3. In implementations, the top wall 32 is disposed between the film assembly 2 and the liquid display panel 20, and a gap 35 of about 1 mm is defined between the film assembly 2 and the liquid display panel 20 in third direction z, so when the liquid display panel 20 is impacted, the gap 35 can play a buffer role to protect an internal film assembly 2 from damages as much as possible.

In some implementations, the top wall 32 of the plastic frame 3 further defines a groove 323 at one side of the top wall 32 away from the bottom cover 11, and an adhesive strip 34 is mounted in the groove 323. For example, the adhesive strip 34 may be a single-sided adhesive strip. Here, the display device 100 may be a product with an outer frame, and the adhesive strip 34 is only configured to bear the liquid display panel 20 to prevent light leakage. In addition, the adhesive strip 34 may also be a double-sided adhesive strip. Here, the display device 100 may be a product with a narrow outer frame or without the outer frame, and the adhesive strip 34 is configured to bond the backlight module 10 and the liquid display panel 20 to fix and support the liquid display panel 20.

Compared with the related art, as for the backlight module 10 in implementations of the present disclosure, by bearing of the back cover 1 in third direction z and limiting of the back cover 1 in first direction x and second direction y, in conjunction with limiting of the plastic frame 3 in third direction z, three-dimensional limiting of the film assembly 2 is realized, thereby avoiding usage of an adhesive tape with a complex process, a low production efficiency, and more consumables to attach and fix the film assembly 2. In addition, when the display device 100 in implementations is under product verification or transportation, the film assembly 2 is not easy to be disengaged with the back cover 1 due to shaking. The backlight module 10 can provide uniformly distributed light sources to avoid various display defects in an appearance of the display device 100. Moreover, the gap is defined between the film assembly 2 and the limiting member 13, such that when the film assembly 2 expands or suspends due to temperature and humidity changes or is suspended at a large inclined angle, the film assembly 2 can be stably fixed, and detachment, displacement, and arching of the film assembly 2 can be prevented. Secondly, the plastic frame 3 defines limiting grooves, and the back cover 1 is snapped into the limiting grooves, such that a mounting process of the backlight module 10 is simple and convenient, and limiting is easy. Furthermore, the limiting member 13 of the back cover 1 is formed by bending for multiple times and the plastic frame 3 is designed to be partially grooved, which has high process feasibility, a relatively small influence on the total costs, and is not easy to cause a cost increase, and is helpful to improve a product yield and a production efficiency of a production line.

The above shows and describes the basic principle, main features, and advantages of the present disclosure in detail. Those skilled in the art will understand after reading the principle of the present disclosure. Therefore, the present disclosure is not limited by the above structural examples. The above structural examples and specific implementations only describe principles of the present disclosure. On the premise of not departing from the principles and scope of the present disclosure, there will be other changes and improvements in the present disclosure, and all of these changes and improvements will fall within the scope of the present disclosure to be claimed.

What is claimed is:

1. A backlight module, comprising:
   a back cover comprising a bottom cover and a side cover, wherein the side cover is connected with a periphery of the bottom cover, and the side cover and the bottom cover cooperatively define an accommodation space;
   a support plate connected with the side cover, wherein the support plate is bent relative to the side cover and is located in the accommodation space;
   a plastic frame comprising a side wall and a top wall, wherein the side wall is connected with a periphery of the top wall, the side wall is fixedly connected with the side cover, and the top wall is located at one side of the support plate away from the bottom cover;
   an engaging member located between the support plate and the top wall, and connected with the support plate or the top wall;
   a film assembly mounted in the accommodation space, wherein the film assembly comprises a film assembly body and a tab, the tab is connected with a peripheral side surface of the film assembly body, the film assembly body is located at one side of the engaging member facing the accommodation space, the tab is at least partially located between the support plate and the top wall, the tab is snapped into the engaging member, and the top wall covers the tab and a periphery of the film assembly body, wherein
   the engaging member is connected with the support plate, the top wall defines a first limiting groove at one side of the top wall facing the accommodation space, the engaging member is partially snapped into the first limiting groove, and a height of the engaging member is larger than a sum of a thickness of the film assembly and a depth of the first limiting groove.

2. The backlight module of claim 1, wherein a gap is defined between the top wall and the film assembly.

3. The backlight module of claim 1, wherein a gap is defined between the engaging member and the film assembly body, and a gap is defined between the engaging member and the tab.

4. The backlight module of claim 1, wherein the side wall defines an avoidance space at one side of the side wall facing the accommodation space, and the avoidance space is defined opposite to the tab.

5. The backlight module of claim 1, wherein the engaging member comprises a first lug and a second lug spaced apart from the first lug, and the tab is located between the first lug and the second lug.

6. The backlight module of claim 1, wherein the top wall defines a second limiting groove at one side of the top wall facing the accommodation space, and the side cover is partially snapped into the second limiting groove.

7. The backlight module of claim 1, wherein the tab is at least arranged at a first edge and a second edge of the film assembly body, and the first edge and the second edge are adjacent edges or opposite edges of the film assembly body.

8. The backlight module of claim 1, further comprising a light guide plate, a light strip, and a reflecting plate, wherein the light guide plate, the light strip, and the reflecting plate are accommodated in the accommodation space, the light strip comprises a plurality of light-emitting diodes (LEDs), and the light guide plate is configured to covert lights emitted by the plurality of LEDs of the light strip into lights of area light source and then emit the lights converted.

9. The backlight module of claim 8, wherein the bottom cover comprises a first part and a second part, the second part is connected with and disposed around the first part, the first part exceeds the second part at one side of the second part, the first part protrudes toward the accommodation space, the first part is configured to support the light guide plate, and the side cover, the first part, and the second part cooperative define a sinking groove, and the sinking groove functions as a reserved space for the light strip.

10. A display device comprising a liquid display panel and a backlight module, wherein the liquid display panel is located at one side of the film assembly away from the bottom cover, and is fixedly connected with the plastic frame, wherein the backlight module comprises:
  a back cover comprising a bottom cover and a side cover, wherein the side cover is connected with a periphery of the bottom cover, and the side cover and the bottom cover cooperatively define an accommodation space;
  a support plate connected with the side cover, wherein the support plate is bent relative to the side cover and is located in the accommodation space;
  a plastic frame comprising a side wall and a top wall, wherein the side wall is connected with a periphery of the top wall, the side wall is fixedly connected with the side cover, and the top wall is located at one side of the support plate away from the bottom cover;
  an engaging member located between the support plate and the top wall, and connected with the support plate or the top wall;
  a film assembly mounted in the accommodation space, wherein the film assembly comprises a film assembly body and a tab, the tab is connected with a peripheral side surface of the film assembly body, the film assembly body is located at one side of the engaging member facing the accommodation space, the tab is at least partially located between the support plate and the top wall, the tab is snapped into the engaging member, and the top wall covers the tab and a periphery of the film assembly body, wherein
  the engaging member is connected with the support plate, the top wall defines a first limiting groove at one side of the top wall facing the accommodation space, the engaging member is partially snapped into the first limiting groove, and a height of the engaging member is larger than a sum of a thickness of the film assembly and a depth of the first limiting groove.

11. The display device of claim 10, wherein a gap is defined between the top wall and the film assembly.

12. The display device of claim 10, wherein a gap is defined between the engaging member and the film assembly body, and a gap is defined between the engaging member and the tab.

13. The display device of claim 10, wherein the side wall defines an avoidance space at one side of the side wall facing the accommodation space, and the avoidance space is defined opposite to the tab.

14. The display device of claim 10, wherein the engaging member comprises a first lug and a second lug spaced apart from the first lug, and the tab is located between the first lug and the second lug.

15. The display device of claim 10, wherein the top wall defines a second limiting groove at one side of the top wall facing the accommodation space, and the side cover is partially snapped into the second limiting groove.

16. The display device of claim 10, wherein the tab is at least arranged at a first edge and a second edge of the film assembly body, and the first edge and the second edge are adjacent edges or opposite edges of the film assembly body.

* * * * *